Jan. 24, 1956
G. SCHAMING
2,731,860
DEVICE FOR CENTERING DISKS TO BE FLATTENED BETWEEN DIES
Filed Jan. 7, 1953
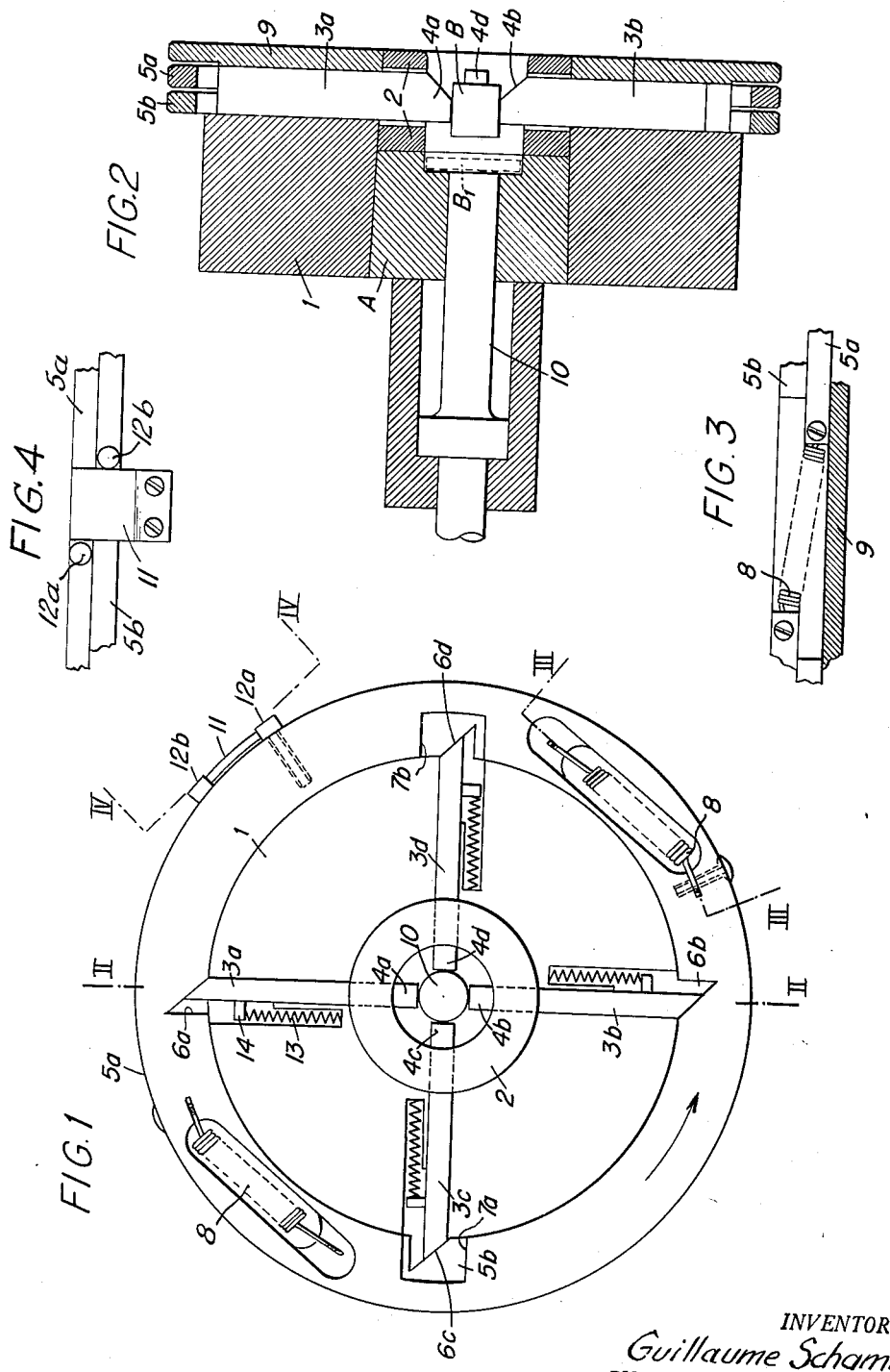
INVENTOR.
Guillaume Schaming
BY
Churchill, Rich, Weymouth & Engel
Attorneys.

United States Patent Office 2,731,860
Patented Jan. 24, 1956

2,731,860
DEVICE FOR CENTERING DISKS TO BE FLATTENED BETWEEN DIES

Guillaume Schaming, Richmond, Surrey, England, assignor to Societe Schostal, Vaduz, Liechtenstein, a joint-stock company Application January 7, 1953, Serial No. 330,102
Claims priority, application Switzerland January 15, 1952

5 Claims. (Cl. 78—17)

The present invention relates to the manufacture of mechanical parts, by die-stamping metal disks or slugs. These disks are preferably sheared from metal bars. The thickness of disks so produced cannot be less than a certain minimum, dependent on the section of the bar, but that minimum thickness may in certain cases be very much greater than the thickness of the part to be manufactured; it will then be necessary to flatten them out in a die, by compression along their axis, by a die-stamping operation as a preliminary to the final shaping or machining.

It is, of course, essential that the disk to be flattened out shall be located in central relation to the flattening die before it is compressed in the latter.

The section of the disks obtained by shearing from a bar may be more or less deformed, for example of oval shape, and the centering device must take account of such deformation.

The present invention has for its main object to provide means for the accurate centering of the disks to be flattened.

For the centering of the disks there are disposed, at the entrance to the stamping die, four jaws guided in radial directions and spaced at 90° to one another, two opposite jaws being actuated together by one rotatable ring formed with ramps, and the two others by another rotatable ring formed with inverse ramps, the two rings being connected to one another by springs.

In the accompanying drawings, which represent by way of example the present preferred embodiment of the invention, Fig. 1 is a front view of the centering device with cover plate removed;

Fig. 2 is a section along the line II—II of Fig. 1;

Fig. 3 is a partial profile view on the line III—III of Fig. 1; and

Fig. 4 is a partial profile view on the line IV—IV of Fig. 1.

As represented in Figs. 1 and 2, the die A is surrounded by a hoop or stock 1, into which there is also fitted, at the entry to the die, one extremity of a socket 2. The side wall of this socket is pierced with four slots or mortises spaced at 90° to one another. The said slots allow passage to the same number of slides 3a, 3b, 3c and 3d, which are guided radially in grooves in the hoop or stock 1. The extremities of these slides in the interior of the socket 2 form jaws for the centering of a disk to be worked in the die, one such disk being shown at B in Fig. 2.

The other extremities of two of the slides 3a, 3b set opposite to one another, cooperate with a rotatable peripheral ring 5a, in which there are formed, at diametrically opposite points, angular notches 6a, 6b, each having an inclined ramp-forming flank in contact with a bevel of the same inclination formed at the extremity of the respective slide 3a or 3b, as seen in Fig. 1. The notches 6a, 6b allow for rotation of the ring 5a, in either direction, through a certain limited angle.

The other two slides 3c, 3d, also opposite to one another, cooperate with another rotatable peripheral ring 5b. The latter receives the external beveled extremities of the slides 3c, 3d, which engage in two angular notches 6c, 6d, each having a face or ramp inclined in the inverse sense of that of the notches on the ring 5a. The bevel at the outer end of each of the slides is maintained in contact with the inclined face or ramp of the corresponding notch, by a spring 13, lodged in a radial hole upon the hoop or stock 1, and acting on a lateral spur 14 upon the slide in question. Wide notches 7a, 7b are formed in the ring 5a, adjacent to the radial positions of the slides 3c, 3d, so that this ring does not interfere with their movements.

The two rings 5a, 5b are connected to one another by means of springs 8 secured thereto as shown in Figs. 1 and 3, extending through openings in the rings, tending to rotate them in opposite directions so as to bring the jaws together, the movement of the ring 5a being indicated by an arrow in Fig. 1. The rings are maintained in place against the front face of the hoop or stock 1, by a cover plate 9, as seen in Fig. 2, it being assumed that the cover plate has been removed in Fig. 1.

The jaws of the four slides are beveled at 4a, 4b, 4c, 4d towards the exterior, as seen in Fig. 2, over a portion of their height, so that they will open up when the disk to be flattened is introduced between them and when the main punch (not shown) forces this disk into the die-socket 2.

The bottom of the die A is traversed by an axial punch 10, for extracting the flattened blank B₁ (shown in dotted lines in Fig. 2), resulting from the compression of the disk B.

In the example chosen, the extractor punch 10 might also serve to limit the inward strokes of the jaws which would then close upon it in its projected position, leaving enough space between them to receive a disk or block B to be flattened. It is, however, advantageous that the diameter of the extractor punch shall be less than the minimum diameter of the space between the jaws, in order to avoid any accident, if the press is running idly. The extraction of the flattened blank must then take place at the same time that the main punch retires, in order that the jaws, which are kept open by this main punch shall not close again in front of the flattened blank B₁, and prevent it from being ejected. The extractor 10 has an idle stroke, which is absorbed by a spring, and is thereby normally maintained for some time behind the jaws, during the withdrawal of the main punch.

When a disk to be worked in the die is introduced between the jaws, it separates the latter, acting upon their terminal bevels, 4a, 4b, 4c, and 4d, and it is centered by the jaws due to their connection by the rotatable rings. The main punch, in acting upon the inserted disk, drives the extractor punch fully back.

In some cases, it is advisable to provide stops for the rings 5a, 5b to limit the approach of the jaws when no disk is inserted. For this purpose, there may be provided a fixed stop 11, cooperating with projections 12a, 12b on the periphery of the rings 5a, 5b, as indicated in Figs. 1 and 4.

The above described device is to be taken as merely illustrative of the invention which is not limited thereto but is to be construed according to the appended claims.

What I claim is:

1. A device for centering metal bar sections at the entrance to dies adapted to flatten them comprising a plurality of pairs of jaws radially arranged with reference to the center of the dies, means for slidably supporting the jaws, means for urging the jaws outwardly and a plurality of revolving peripheral rings provided with ramps adapted to bear against the outer ends of opposed pairs of jaws to move them inwardly, the movement of each pair being independent of the movement of other pairs of jaws.

2. A centering device for a disk to be formed in a die cavity of larger diameter than the disk, comprising, four radially extending jaws spaced substantially 90° apart and adapted to be positioned in front of said cavity, means for slidably supporting the jaws, said jaws having beveled outer ends, a pair of rotatable members surrounding said outer ends and having angularly disposed faces coacting therewith upon rotation to move said jaws inwardly, one pair of opposed jaws being actuated by one rotatable member and the other pair of opposed jaws being actuated by the other rotatable member, and springs associated with said jaws moving them outwardly into contact with said faces.

3. The device of claim 2 wherein said rotatable members move their respective jaws inwardly by rotation in opposite directions.

4. The device of claim 3 wherein said rotatable members are coupled by springs acting to move them in opposite directions tending to move said jaws inwardly.

5. The device of claim 4 wherein each rotatable member is provided with a projection on its periphery, and a fixed stop is arranged in a position to be engaged on opposite sides by said projections to limit the approach of said jaws.

References Cited in the file of this patent

UNITED STATES PATENTS

| | | |
|---|---|---|
| 34,153 | Mason | Jan. 14, 1862 |
| 439,952 | Hendey | Nov. 4, 1890 |
| 953,616 | Henrich | Mar. 29, 1910 |
| 1,036,206 | Ferrier | Aug. 20, 1912 |